United States Patent [19]

Knobloch

[11] Patent Number: 5,574,085
[45] Date of Patent: Nov. 12, 1996

[54] STABILISATION OF BLACK-FILLED RUBBER

[75] Inventor: Gerrit Knobloch, Magden, Switzerland

[73] Assignee: Ciba-Geigy Corporation, Tarrytown, N.Y.

[21] Appl. No.: 518,477

[22] Filed: Aug. 21, 1995

Related U.S. Application Data

[63] Continuation of Ser. No. 364,034, Dec. 27, 1994, abandoned, which is a continuation of Ser. No. 109,418, Aug. 19, 1993, abandoned.

[30] Foreign Application Priority Data

Aug. 25, 1992 [CH] Switzerland ............................ 2639/92

[51] Int. Cl.$^6$ .................................................. C08K 5/37
[52] U.S. Cl. ............................................................ 524/289
[58] Field of Search ............................................. 524/289

[56] References Cited

U.S. PATENT DOCUMENTS

| | | | |
|---|---|---|---|
| 3,364,156 | 1/1968 | Kraus | 524/495 |
| 3,449,284 | 6/1969 | Pollock | 524/495 |
| 3,538,047 | 11/1970 | Braus et al. | 524/289 |
| 3,810,869 | 5/1974 | Zaweski . | |
| 3,832,328 | 8/1974 | Eggensperger et al. | 524/289 |
| 4,021,468 | 5/1977 | Lind | 524/289 |
| 4,889,883 | 12/1989 | Rosenberg et al. . | |
| 4,954,275 | 9/1990 | Rosenberger et al. . | |

FOREIGN PATENT DOCUMENTS 1135699  12/1968  United Kingdom .

OTHER PUBLICATIONS

ASTM D 1646-72 pp. 786–792.

*Primary Examiner*—Veronica P. Hoke
*Attorney, Agent, or Firm*—Luther A. R. Hall; Michele A. Kovaleski

[57] ABSTRACT

A composition comprising
a) an uncross linked black-filled rubber homopolymer, copolymer or terpolymer based on diene monomers, and
b) at least one compound of formula (I)

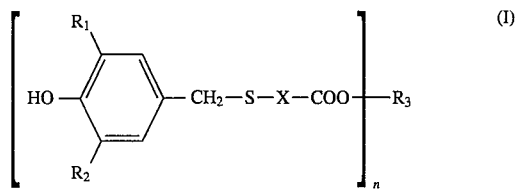

wherein n is 1, 2, 3 or 4, $R_1$ and $R_2$ are each independently of the other $C_1$–$C_4$alkyl or $C_5$–$C_8$cycloalkyl, X is methylene or ethylene and, when n is 1, $R_3$ is $C_1$–$C_{20}$alkyl, $C_3$–$C_{20}$alkyl which is interrupted by —O— and/or —S—; $C_3$–$C_{20}$alkenyl, $C_5$–$C_{12}$cycloalkyl, $C_1$–$C_4$alkyl-substituted $C_5$–$C_{12}$cycloalkyl; phenyl, $C_1$–$C_4$alkyl-substituted phenyl; $C_7$–$C_{10}$phenylalkyl or $C_7$–$C_{10}$phenylalkyl which is substituted in the phenyl moiety by $C_1$–$C_4$alkyl; when n is 2, $R_3$ is $C_2$–$C_{10}$alkylene, $C_4$–$C_{10}$alkylene which is interrupted by —O— and/or —S—, $C_6$–$C_{12}$cycloalkylene or phenylene; when n is 3, $R_3$ is $C_3$–$C_8$alkanetriyl and, when n is 4, $R_3$ is $C_4$–$C_8$alkanetetrayl.

13 Claims, No Drawings

STABILISATION OF BLACK-FILLED RUBBER

This application is a continuation, of application Ser. No.08/364,034 filed Dec. 27, 1994 now abandoned which is a continuation of application Ser. No. 08/109,418 filed Aug. 19, 1993, now abandoned.

The present invention relates to compositions comprising a black-filled rubber homopolymer, copolymer or terpolymer based on diene monomers, and a sulfur-containing, sterically hindered phenolic antioxidant, and to the use of said phenolic antioxidant for stabilising black-filled rubber compositions (carbon black masterbatches).

Sulfur-containing, sterically hindered phenolic antioxidants are disclosed in GB-A-1 135 699. The stabilisation of vulcanisates (crosslinked rubber) is disclosed, inter alia, in U.S. Pat. No. 3,810,869, and EP-A-59 168 discloses the stabilisation of nonpigmented rubber.

In the art of polymer processing, the term "carbon black masterbatch" is applied to a substantially still uncrosslinked carbon black-filled rubber. This masterbatch is a crude rubber to which the crosslinking agent necessary for vulcanisation (sulfur or peroxide) has not yet been added.

A carbon black masterbatch is a compounded mixture which should not be stored for an unnecessarily long period of time. Nonpigmented rubber has a substantially longer life than a black-filled rubber. For example, nonpigmented ®BUNA EM 1500 rubber has a storage life of at least one year when kept under dry conditions at temperatures up to 30° C. and protected from sunlight, whereas carbon black-filled ®BUNA EM 1605 rubber has only a storage life of at least half a year.

It is the function of rubber stabilisers to prevent the oxidative crosslinking of the black-filled rubber. This protection is necessary to permit mixing and forming. The controlled crosslinking of the rubber to form vulcanised rubber by addition of crosslinking agents such as sulfur or peroxide to the prior mixing process may not take place until after forming.

The stabilisation of black-filled rubber gives rise to greater problems than the stabilisation of nonpigmented rubber, as interactions may occur between the active carbon black filler and the rubber on the one hand and the stabiliser system on the other. Consequently, different demands are made of the effectiveness of the stabilisers during the stabilisation of these two types of rubber.

It has now been found that specific sulfur-containing, sterically hindered phenolic antioxidants very substantially prolongs the storage life of black-filled rubber.

Accordingly, the invention relates to a composition comprising
a) a black-filled rubber homopolymer, copolymer or terpolymer based on diene monomers, and
b) at least one compound of formula (I)

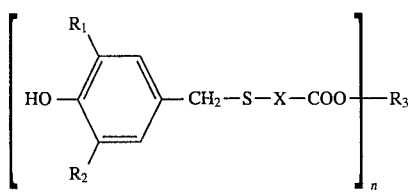

wherein n is 1, 2, 3 or 4, R and $R_2$ are each independently of the other $C_1$–$C_4$alkyl or $C_5$–$C_8$cycloalkyl, X is methylene or ethylene and, when n is 1, $R_3$ is $C_1C_{20}$alkyl, $C_3$–$C_{20}$alkyl which is interrupted by —O— and/or —S—; $C_3C_{20}$alkenyl, $C_5C_{12}$cycloalkyl, $C_1$–$C_4$alkyl-substituted $C_5$–$C_{12}$cycloalkyl; phenyl, $C_1C_4$alkyl-substituted phenyl; $C_7$–$C_{10}$phenylalkyl or $C_7$–$C_{10}$phenylalkyl which is substituted in the phenyl moiety by $C_1$–$C_4$alkyl; when n is 2, $R_3$ is $C_2$–$C_{10}$alkylene, $C_4$–$C_{10}$alkylene which is interrupted by —O— and/or —S—, $C_6$–$C_{12}$cycloalkylene or phenylene; when n is 3, $R_3$ is $C_3$–$C_8$alkanetriyl and, when n is 4, $R_3$ is $C_4$–$C_8$alkanetetrayl.

Alkyl of up to 20 carbon atoms typically includes methyl, ethyl, propyl, isopropyl, sec-butyl, tert-butyl, tert-pentyl, hexyl, 2-ethylhexyl, n-octyl, isooctyl, 1,1,3,3-tetramethylbutyl, decyl, dodecyl, tridecyl, hexadecyl, octadecyl, nonadecyl or icosyl. Two preferred meanings of $R_1$ and $R_2$ are methyl and tert-butyl. $R_3$ is preferably $C_8$–$C_{13}$alkyl.

$C_3$–$C_{20}$Alkyl which is interrupted by —O— and/or—S— is typically 3-oxaheptyl, 3-oxa-5-methylhexyl, 3-thiaheptyl or 3-thia-5-methylhexyl. An alkylene group containing two or more carbon atoms is preferably present between the free valence and the first hereto atom.

$C_3$–$C_{20}$Alkenyl may typically be allyl or oleyl. The carbon atom in 1-position is preferably saturated.

Unsubstituted or $C_1$–$C_4$alkyl-substituted cycloalkyl containing up to 12 carbon atoms will typically be cyclopentyl, cyclohexyl, cycloheptyl, cyclooctyl, cyclodecyl, cyclododecyl, methylcyclohexyl or butylcyclohexyl. Cyclohexyl is preferred.

$C_1C_4$Alkyl-substituted phenyl is typically methylphenyl, dimethylphenyl or butylphenyl.

Unsubstituted or $C_1C_4$alkyl-substituted $C_7$–$C_{10}$phenylalkyl will typically be benzyl, methylbenzyl, dimethylbenzyl, trimethylbenzyl, tert-butylbenzyl or phenylethyl. Benzyl is preferred.

$C_2$–$C_{10}$Alkylene will typically be methylene, ethylene, trimethylene, tetramethylene, pentamethylene, 2,2-dimethyltrimethylene, hexamethylene, octamethylene or decamethylene. $C_2$–$C_6$Alkylene, preferably hexamethylene, is preferred.

$C_4$–$C_{10}$Alkylene interrupted by —O— and/or —S— is typically 4-oxaheptamethyl-1,7-ene; 3,6-dioxaoctamethyl-1,8-ene; 2-thiapropyl- 1,3-ene or 3-thiapentyl- 1,5-ene. The groups —(CH$_2$)$_2$—S—(CH$_2$)$_2$— and —(CH$_2$)$_2$—O—(CH$_2$)$_2$—O—(CH$_2$)$_2$— are preferred.

$C_6$–$C_2$Cycloalkylene will typically be cyclohexylene or dicyclohexylene. 1,4–Cyclohexyl- ene is preferred.

Phenylene is 1,2-, 1,3- or 1,4-phenylene. $C_3$–$C_8$Alkanetriyl is typically

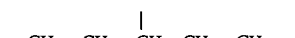

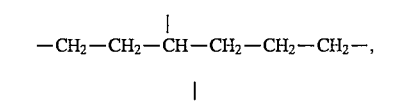

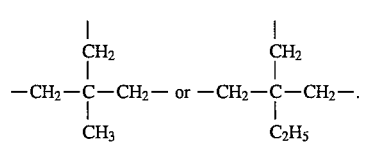

$C_4$–$C_8$Alkanetetrayl is typically

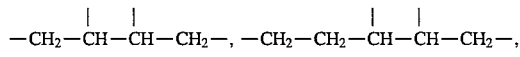

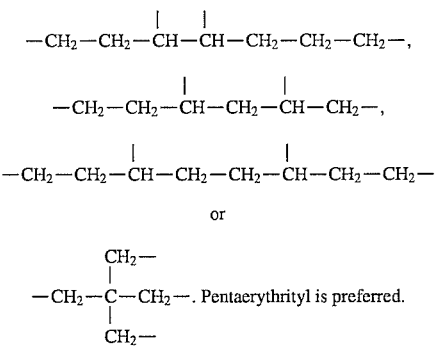

Compounds of formula (I) are preferred wherein n is 1, 2, 3 or 4, $R_1$ and $R_2$ are each independently of the other $C_1$–$C_4$alkyl or cyclohexyl and, when n is 1, $R_3$ is $C_5$–$C_{18}$alkyl, $C_3$–$C_{20}$alkyl which is interrupted by —O— or —S—; $C_3$–$C_{20}$alkenyl, $C_5$–$C_7$cycloalkyl, $C_1$–$C_4$alkyl-substituted $C_5$–$C_7$cycloalkyl; phenyl, $C_1$–$C_4$alkyl-substituted phenyl; benzyl or benzyl which is substituted in the phenyl nucleus by $C_1$–$C_4$alkyl and, when n is 2, $R_3$ is $C_2$–$C_8$alkylene, $C_4$–$C_{10}$alkylene which is interrupted by —O— or —S—, cyclohexylene or phenylene.

Also preferred are compounds of formula (I), wherein n is 1, 2, 3 or 4, $R_1$ and $R_2$ are each independently of the other methyl, tert-butyl or cyclohexyl and, when n is 1, $R_3$ is $C_5C_{15}$alkyl, $C_3C_{10}$alkyl which is interrupted by —O— or —S—, $C_3C_{20}$alkenyl, cyclohexyl, methyl- or butyl-substituted cyclohexyl; phenyl, methyl- or butyl-substituted phenyl; or benzyl, and, when n is 2, $R_3$ is $C_2$–$C_6$alkylene or $C_4$–$C_6$alkylene which is interrupted by —O— or—S—.

Compounds of formula (I) are also of interest wherein n is 1, 2 or 4, $R_1$ and $R_2$ are each independently of the other methyl or tert-butyl and, when n is 1, $R_3$ is $C_8$–$C_{13}$alkyl and, when n is 2, $R_3$ is $C_2C_6$alkylene or $C_4$–$C_6$alkylene which is interrupted by —O— and, when n is 4, $R_3$ is pentaerythrityl.

Particularly preferred compounds of formula (I) are those wherein n is 1, $R_1$ and $R_2$ are tert-butyl, X is methylene and $R_3$ is $C_8$–$C_{13}$alkyl.

Compounds of special interest are isooctyl-(3,5-di-tert-butyl-4-hydroxybenzylthio)acetate and isotridecyl-(3,5-di-tert-butyl-4-hydroxybenzylthio)acetate.

The compounds of formula (1) are known compounds. If they are not commercially available, they can be prepared by methods analogous to known ones as described, inter alia, in GB-A-1 135 699.

In addition to prolonging storage life, the compounds of formula (1) also enhance the processing stability of black-filled rubber.

Component (a) of the novel compositions is typically a black-filled butadiene, isoprene or chloroprene homopolymer or a black-filled copolymer of a diene such as butadiene or isoprene with styrene, acrylonitrile, ethylene, propylene or isobutylene, or a black-filled terpolymer of ethylene with propylene and a diene such as dicyclopentadiene, 1,4-hexadiene or ethylidene norbornene, or a black-filled terpolymer of butadiene with isoprene and styrene.

The diene content of the black-filled rubber is preferably 0.3–100% by weight.

The diene content of the copolymer is preferably 50–90% by weight.

The diene content of the black-filled butadiene-isoprene-styrene terpolymer is preferably 50–90% by weight and the ratio of butadiene/isoprene is conveniently 1:2–2:1. The diene content of a black-filled rubber terpolymer of ethylene, propylene and a diene is conveniently 0.3–10% by weight and the ratio of ethylene/propylene is preferably 1:2-2:1.

The indicated amount of diene is in each case based on the rubber without carbon black.

Illustrative examples of black-filled rubber are black-filled butadiene homopolymers, black-filled isobutylene-isoprene copolymers, black-filled styrene-butadiene copolymers, black-filled acrylonitrile-butadiene copolymers or black-filled halogenated isoprene-iso- butylene rubber.

A diene monomer-based black-filled homopolymer, copolymer or terpolymer is preferred in which the diene monomer is butadiene, isoprene, chloroprene, dicyclopentadiene, 1,4-hexadiene or ethylidene norbornene.

Black-filled polybutadiene, black-filled polyisoprene and black-filled styrene-butadiene copolymers are especially preferred as component a).

Also of interest is a stabilised composition wherein component a) is a diene monomer-based black-filled copolymer containing 50 to 90% by weight of diene, based on the rubber without carbon black, and the diene monomers are budatiene, isoprene or chloroprene, and the comonomers are styrene, acrylonitrile or isobutylene.

In industrial production, the carbon black is conveniently incorporated into the rubber after the polymerisation by direct addition to the latex, i.e. before coagulation. The carbon black is slurried in water with a surfactant and the pigment slurry may be added to the latex together with an oil. It has been found that the addition of an oil permits easy handling of the rubber in further processing.

Accordingly, the invention also relates to a formulation comprising as additional component c) 0.01 to 90% by weight, typically 0.01 to 35% by weight, preferably 0.01 to 14% by weight, or 14 to 90% by weight, preferably 35 to 70% by weight, based on the rubber without carbon black, of a naphthenic, aromatic or paraffinic oil or a mixture thereof.

The weight ratio of carbon black/rubber in component a) is preferably 0.2/1 to 1/1, most preferably 0.2/1 to 0.5/1, typically 0.3/1 to 0.5/1.

The novel compositions will typically contain the compounds of formula (I) in a concentration of 0.05 to 5% by weight, preferably 0.05 to 2% by weight, most preferably 0.1 to 2% by weight, based on the rubber without carbon black. They can be added—in conjunction with optional additives—to the latex in the form of a solution, emulsion or dispersion. The stabiliser system is frequently stirred into the latex together with the pigment slurry and the oil.

Illustrative examples of conventional additives are:
1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6odicyclopentyl-4-methylphenol, 2-(ct-methylcyclo- hexyl)-4,6-dimethylphenol, 2,6-dioctadecyl-4-methylphenol, 2,4,6-tricyclohexylphenol, 2,6-di-tert-butyl-4-methoxymethylphenol, 2,6-di-nonyl-4-methylphenol, 2,4dimethyl-6-(1 '- methylundec-1'-yl)phenol, 2,4-dimethyl-6-(1-methylheptadec- 1-yl)phenol, 2,4methyl-6-(1 '-methyltridec- 1 '-yl)phenol and mixtures thereof.

1.2. Alkylthiomethylphenol, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone,. 2,5-di-tert-amylhydroquinone, 2,6-diphenyl-4-octadecyloxyphenol, 2,6-di-tert-butylhydroquinone, 2,5-di-tert-butyl4-hydroxy- anisole, 3,5-di-tert-butyl-4ohydroxyanisole, 3,5-di-tert-butyl-4-hydroxyphenylstearate, bis-(3,5-di-tert-butyl-4-hydroxyphenyl)adipate.

1.4. Hydroxylated thiodiphenyl ethers, for example 2,2'-thiobis(6-tert-butyl-4-methyl- phenol), 2,2'-thiobis(4-octylphenol), 4,4'-thiobis(6-tert-butyl-3-methylphenol), 4,4'-thio-bis(6-tert-butyl-2-methylphenol), 4,4'-thiobis-(3,6-di-sec-amylphenol), 4,4'-bis-(2,6-dim- ethyl-4-hydroxyphenyl)disulfide.

1.5. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methyl- cyclohexyl)phenol], 2,2'-methylenebis(4-methyl-6ocyclohexylphenol), 2,2'-methylene- bis(6-nonyl-4-methylphenol), 2,2'-methylenebis(4,6-di-tert-butylphenol), 2,2'-ethylidene-bis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4- nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3- tert-butyl-5-methyl-2-hydroxybenzyl)-4-methylphenol, 1,1,3-tris(5-tert-butyl-4-hydroxy- 2-methylphenyl)butane, 1,1-bis(5-tert-butyl-4-hydroxy-2-methyl-phenyl)-3-n-dodecylmer- captobutane, ethylene glycol bis[3,3-bis(3'-tert-butyl-4'-hydroxyphenyl)butyrate], bis(3tert-butyl-4-hydroxy-5-methyl-phenyl)dicyclopentadiene, bis[2-(3'-tert-butyl-2'-hydroxy- 5'-methylbenzyl)-6-tert-butyl-4-methylphenyl]terephthalate, 1,1-bis-(3,5-dimethyl-2- hydroxyphenyl)butane, 2,2-bis-(3,5-di-tert-butyl-4-hydroxyphenyl)propane, 2,2-bis-(5- tert-butyl-4-hydroxy2-methylphenyl)-4-n-dodecylmercaptobutane, 1,1,5,5-tetra-(5-tert- butyl-4-hydroxy2-methylphenyl)pentane.

1.6. O-, N- and S-benzyl compounds, for example 3,5,Y,5'-tetra-tert-butyl-4,4'-dihydroxy- dibenzyl ether, tris(3,5-di-tert-butyl-4-hydroxybenzyl)amine, bis(4-tert-butyl-3-hydroxy- 2,6-dimethylbenzyl)dithioterephthalate, bis(3,5-di-tert-butyl-4-hydroxybenzyl)sulfide.

1.7. Hydroxybenzylated malonates, for example dioctadecyl-2,2-bis-(3,5-di-tert-butyl-2- hydroxybenzyl)-malonate, di-octadecyl-2-(3-tert-butyl-4-hydroxy-5-methylbenzyl)-malo- nate, di-dodecylmercaptoe th yl- 2,2-bis-(3,5-di-tert-butyl-4-hydroxybenzyl )malonate, bis- [4-(1,1,3,3-tetramethylbutyl)phenyl]-2,2-bis(3,5-di-tert-butyl-4-hydroxybenzyl)malonate.

1.8. Aromatic hydroxybenzyl compounds, for example 1,3,5-tris-(3,5-di-tert-butyl-4-hy- droxybenzyl)-2,4,6-trimethylbenzene, 1,4-bis(3,5-di-tert-butyl-4-hydroxybenzyl)-2,3,5,6- tetramethylbenzene, 2,4,6-tris(3,5-di-tert-butyl-4-hydroxybenzyl)phenol.

1.9. Triazine Compounds, for example 2,4-bis(octylmercapto)-6-(3,5-di-tert-butyl-4- hydroxyanilino)- 1,3,5-triazine, 2-octylmercapto-4,6-bis(3,5-di-tert-butyl-4-hydroxyanilino)- 1,3,5-triazine, 2-octylmercapto-4,6-bis(3,5-di-tert-butyl-4-hydroxyphenoxy)- 1,3,5-triazine, 2,4,6-tris(3,5-di-tert-butyl-4-hydroxyphenoxy)- 1,2,3-triazine, 1,3,5-tris-(3,5-di-tert-butyl-4-hydroxybenzyl)isocyanurate, 1,3,5-tris(4-tert-butyl-3-hydroxy-2,6-di- methylbenzyl)isocyanurate, 2,4,6-tris(3,5-di-tert-butyl-4-hydroxyphenylethyl)- 1,3,5-tri- azine, 1,3,5-tris(3,5-di-tert-butyl-4-hydroxyphenylpropionyl)-hexahydro- 1,3,5-triazine, 1,3,5-tris(3,5-dicyclohexyl-4-hydroxybenzyl)isocyanurate.

1.10. Benzylphosphonates, for example dimethyl-2,5-di-tert-butyl-4-hydroxybenzylphos- phonate, diethyl-3,5-di-tert-butyl-4-hydroxybenzylphosphonate, dioctadecy13,5-di-tert- butyl-4-hydroxybenzylphosphonate, dioctadecyl-5-tert-butyl-4-hydroxy3-methylbenzyl- phosphonate, the calcium salt of the monoethyl ester of 3,5-di-tert-butyl-4-hydroxybenzyl- phosphonic acid.

1.11. Acylaminophenols, for example 4-hydroxylauranilide, 4-hydroxystearanilide, octyl N-(3,5-di-tert-butyl-4-hydroxyphenyl)carbamate.

1.12. Esters of β-(3,5-di-tert-butyl-4-hydroxyphenyl)propionic acid with mono- or poly- hydric alcohols, e.g. with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hy- droxyethyl)oxamide, 3-thiaundecanol, 3-thiapentadecanol, trimethylhexanediol, tri- methylolpropane, 4-hydroxymethyl-1-phospha-2,6,7-trioxabicyclo[2.2.2]octane.

1.13. Esters of β-(5-tert-butyl4hydroxy-3-methylphenyl)propionic acid with mono- or polyhydric alcohols, e.g. with methanol, ethanol, octadecanol, 1,6-hexanediol, 1,9-nonane- diol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis- (hydroxyethyl)oxamide, 3-thiaundecanol, 3-thiapentadecanol, trimethylhexanediol, tri- methylolpropane, 4-hydroxymethyl- 1-phospha-2,6,7-trioxabicyclo [2.2.2]octane.

1.14 Esters of β-(3,5-dicyclohexyl-4-hydroxyphenyl)propionic acid with mono- or poly- hydric alcohols, e.g. with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hy- droxyethyl)oxamide, 3-thiaundecanol, 3-thiapentadecanol, trimethylhexanediol, tri- methylolpropane, 4-hydroxymethyl 1-phospha-2,6,7-trioxabicyclo [2.2.2]octane.

1.15 Esters of 3,5-di-tertbutyl-4-hydroxyphenyl acetic acid with mono- or polyhydric alcohols, e.g. with methanol, ethanol, octadecanol, 1,6-hexanediol, 1,9nonanediol, ethy- lene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxy- ethyl)oxamide, 3-thiaundecanol, 3-thiapentadecanol, trimethylhexanediol, trimethylolpro- pane, 4-hydroxymethyl- 1-phospha-2,6,7-trioxabicyclo [2.2.2]octane.

1.16. Amides of β-(.3,5-di-tert-butyl4-hydroxyphenyl)propionic acid e.g. N,N'-bis(3,5-di- tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxy- phenylpropionyl)hydrazine.

2.. UV Absorbers and Light Stabilisers 2.1.2-(2 '-Hydroxyphenyl)benzotriazoles, for example 2-(2'-hydroxy-5'-methylphenyl)- benzotriazole, 2-(3', 5'-di-tert-butyl-2-hydroxyphenyl)benzotriazole, 2-(5 -tert-butyl-2 hydroxyphenyl)benzotriazole, 2-(2'-hydroxy-5'-(1,1,3,3-tet- ramethylbutyl)phenyl)benzo- triazole, 2-(3', 5'-di-tert-butyl-2-hydroxyphenyl)-5-chlorobenzotriazole, 2-(3-tert-butyl-2'-hydroxy-5'-methylphenyl)-5-chlorobenzotriazole, 2-(3'-sec-butyl-5'-tert-butyl-2'- hydroxyphenyl)benzotriazole, 2-(2 '-hydroxy-4 '-octyloxyphenyl)benzotriazole, 2-(3', 5'-di-tert-amyl-2'-hydroxyphenyl)benzotriazole, 2-(3', 5'-bis-(α,α-dimethyl -benzyl)-2'-hydroxyphenyl)benzotriazole, mixture of 2-(Y-tert-butyl-2 '-hydroxy-5'- (2-octyloxycarbonylethyl)phenyl)-5-chlorobenzotriazole, 2-(Y-tert-butyl-5'- [2-(2-ethylhexoxy)-carbonylethyl]-2'-hydroxyphenyl)-5-chlorobenzotriazole, 2-(Y-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(Y-tert-butyl-2'-hydroxy-5'-(2-octyloxycarbonylethyl)phenyl)-benzotriazole, 2-(3'-tert- butyl-5'-[2-(2-ethylhexoxy)carbonylethyl]-2'-hydroxyphenyl)benzotriazole, 2-(Y-dodecyl-2'-hydroxy-5'-methylphenyl)benzotriazole, and 2-(3'-tert-butyl-2'-hydroxy- 5'-(2-isooctyloxycarbonylethyl)phenylbenzotriazole, 2,2'-methylene-bis[4-(1,1,3,3- tetramethylbutyl)-6-benzotriazole-2-ylphenol]; the transesterification product of 2-[Y-tert-butyl-5'-(2-methoxycarbonylethyl)-2'-hydroxyphenyl]-2H-benzotriazole with polyethylene glycol 300; [R–CH$_2$CH$_2$–COO(CH$_2$)$_3$]$_2$, where R =3 '-tert-butyl-4'-hydroxy-5 '-2H-benzotriazol-2-ylphenyl.

2.2. 2-HydrobenZophenones, for example the 4-hydroxy, 4-methoxy, 4-octyloxy, 4-de- cyloxy, 4-dodecyloxy, 4-benzyloxy, 4,2', 4'-trihydroxy and 2'-hydroxy-4,4'-dimethoxy derivatives.

2.3. Esters of substituted and unsubstituted benzoic acids, as for example 4-tertbutyl- phenyl salicylate, phenyl salicylate, octylphenyl salicylate, dibenzoyl resorcinol, bis(4- tert-butylbenzoyl) resorcinol, benzoyl resorcinol, 2,4-di-tertbutylphenyl 3,5-di-tert-butyl- 4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxy- benzoate.

2.4. Acrylates, for example ethyl α-cyano-β,β-diphenylacrylate, isooctyl α-cyano-β,β-di- phenylacrylate, methyl α-carbomethoxycinnamate, methyl α-cyano-β-methyl-p-methoxy- cinnamate, butyl α-cyano-β-methyl-p-methoxycinnamate, methyl α-carbomethoxy-p- methoxycinnamate and N-(β-carbomethoxy-β-cyanovinyl)-2-methylindoline.

2.5. Nickel compounds, for example nickel complexes of 2,2'-thio-bis-[4-(1,1,3,3-tetra- methylbutyl)phenol], such as the 1:1 or 1:2 complex, with or without additional ligands such as n-butylamine, triethanolamine or N-cyclohexyldiethanolamine, nickel dibutyldi- thiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5- hydroxypyrazole, with or without additional ligands.

2.6. Sterically hindered amines, for example bis(2,2,6,6-tetramethyl-piperidyl)sebacate, bis(2,2,6,6-tetramethyl-piperidyl)succinate, bis(1,2,2,6,6-pentamethylpiperidyl)sebacate, bis(1,2,2,6,6-pentamethylpiperidyl) n-butyl-3,5-di-tert-butyl-4-hydroxybenzylmalonate, the condensate of 1-(2-hydroxyethyl)-2,2,6,6-tetramethyl-4-hydroxypiperidine and succi- nic acid, the condensate of N,N'-bis(2,2,6, 6-tetramethyl-4-piperidyl)hexamethylenedi- amine and 4-tert-octylamino-2,6-dichloro-1,3,5-triazine, u-is(2,2,6,6-tetramethyl-4-piperi- dyl) nitrilotriacetate, tetrakis(2,2,6,6-tetramethyl-4- piperidyl)-1,2,3,4-butane-tetracar- boxylate, 1,1 '-(1,2-ethanediyl)bis(3,3,5,5-tetramethylpiperazinone), 4-benzoyl-2,2,6,6- tetramethylpiperidine, 4-stearyloxy-2,2,6,6-tetramethylpiperidine, bis(1,2,2,6,6-pentao methylpiperidyl)-2-n-butyl-2-(2-hydroxy-3,5-di-tert-butylbenzyl)malonate, 3-n-octyl- 7,7,9,9-tetramethyl- 1,3,8-triazasprio[4.5]decan-2,4-dion, bis(1-octyloxy-2,2,6,6-tetramethylpiperidyl)sebacate, bis(1-octyloxy-2,2,6,6-tetramethylpiperidyl)succinate, the condensate of N,N'-bis-(2,2,6,6-tetramethyl-4-piperidyl)hexamethylenediamine and 4-morpholino-2,6-dichloro- 1,3,5-triazine, the condensate of 2-chloro-4,6-bis(4-n-butyl- amino-2,2,6,6-tetramethylpiperidyl )-1,3,5-triazine and 1,2-bis(3-aminopropylamino)- ethane, the condensate of 2-chloro-4,6-di-(4-n-butylamino-1,2,2,6,6-pentamethylpiperi- dyl)- 1,3,5-triazine and 1,2-bis-(3-aminopropylamino)ethane, 8-acetyl-3-dodecyl-7,7,9, 9- tetramethyl- 1,3,8-triazaspiro[4.5]decane-2,4-dione, 3-dodecyl- 1-(2,2,6,6-tetramethyl-4- piperidyl)pyrrolidin-2, 5-dione, 3-dodecyl- 1-(1,2,2,6,6-pentamethyl-4-piperidyl)pyrroli- dine-2,5-dione.

2.7. Oxamides, for example 4,4'-dioctyloxyoxanilide, 2,2'-dioctyloxy-5,5'-di-tert-butox- anilide, 2,2'-didodecyloxy-5,5'-di-tert-butoxanilide, 2-ethoxy-2'-ethoxanilide, N,N'- bis(3-dimethylaminopropyl)oxamide, 2-ethoxy-5-tert-butyl-2'-ethoxanilide and its mixture with 2-ethoxy-2'-ethyl-5,4'-di-tert-butoxanilide and mixtures of ortho- and para- methoxy-disubstituted oxanilides and mixtures of o- and p-ethoxy-disubstituted oxani- lides.

2.8.2-(2-Hydroxyphenyl)- ! ,3,5-triazines, for example 2,4,6-tris(2-hydroxy-4-octyloxy- phenyl)- 1,3,5-triazine, 2-(2-hydroxy-4-octyloxyphenyl)-4,6-bis(2,4-dimethylphenyl)- 1,3,5-triazine, 2-(2,4-dihydroxyphenyl)-4,6-bis(2,4-dimethylphenyl)- 1,3,5-triazine, 2,4-bis(2-hydroxy-4-propyloxyphenyl)-6-(2,4-dimethylphenyl)- 1,3,5-triazine, 2-(2-hy- droxy-4-octyloxyphenyl)-4,6-bis(4-methylphenyl)- 1,3, 5-triazine, 2-(2-hydroxy-4-dodecyl- oxyphenyl)-4,6-bis(2, 4-dimethylphenyl)- 1,3,5-triazine, 2-[2-hydroxy-4-(2hydroxy- 3-butyloxy-propoxy)phenyl]-4,6-bis(2,4-dimethyl)- 1,3,5-triazine, 2-[2-hydroxy-4-(2- hydroxy-3-octyloxy-propyloxy)phenyl]-4,6-bis(2,4-dimethyl)- 1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenyl- propionyl) hydrazine, 3-salicyloylamino-1,2,4-triazole, bis(benzylidene)oxalyl di- hydrazide, oxanilide, isophthaloyl dihydrazide, sebacoyl bisphenylhydrazide, N,N'-diacetaladipoyl dihydrazide, N,N'-bis(salicyloyl)oxalyl dihydrazide, N,N'-bis(salicyloyl)- thiopropionyl dihydrazide.

4. Further phosphites and phosphonites, for example Iriphenyl phosphite, diphenyl alkyl phosphites, phenyl dialkyl phosphites, tris(nonylphenyl) phosphite, trilauryl phosphite, tri- octadecyl phosphite, distearyl pentaerythritol diphosphite, tris(2,4-di-tert-butylphenyl) phosphite, diisodecyl pentaerythritol diphosphite, bis(2,4-di-tert-butylphenyl) penta- erythritol diphosphite, bis(2,6-di-tert-butyl-4-methylphenyl)-pentaeryt hritol diphosphite, diisodecyloxypentaerythritol diphosphite, bis(2,4-di-tert-butyl-6-methylphenyl)penta- erythritol diphosphite, bis(2,4,6-tris(tertbutylphenyl)pentaerythritol diphsophite, tristearyl sorbitol triphosphite, tetrakis(2,4-di-tert-butylphenyl)4,4'-biphenylene diphosphonite, 6- isooctyloxy-2,4,8, 10-tetra-tertbutyl- 12H-dibenz[d,g]- 1,3,2-dioxaphosphocin, 6-fluoro-2,4,8,10-tetra-tert-butyl- 12-methyl-dibenz[d,g]- 1,3,2-dioxaphosphocin, bis(2,4-di-tert- butyl-6-methylphenyl)methylphosphite, bis(2,4-di-tert-butyl-6-methylphenyl)ethylphos- phite.

5. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, penta- erythritol tetrakis(β-dodecylmercapto)propionate.

6. Polyamide stabilisers, for example, copper salts in combination with iodides and/or phosphorus compounds and salts of divalent manganese.

7. Basic co-stabilisers, for example, melamine, polyvinylpyrrolidone, dicyandiamide, tri- allyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or zinc pyrocatecholate.

8. Nucleating agents for example, 4-tert-butylbenzoic acid, adipic acid, diphenylacetic acid.

9. Fillers and reinforcing agents, for example, calcium carbonate, silicates, glass fibres, asbestos, talc, kaolin, mica, barium sulfate, metal oxides and hydroxydes, carbon black, graphite.

10. Other additives, for example, plasticisers, lubricants, emulsifiers, pigments, optical brighteners, flameproofing agents, antistatic agents and blowing agents.

11. Benzofuranones and indolinones., for example those disclosed in U.S. Pat. No. 4 325 863 or U.S. Pat. No. 4 338 244.

The invention is illustrated in more detail by the following Example in which, unless otherwise stated, parts and percentages are by weight.

EXAMPLE 1

I) Preparation of a Rolled Sheet from a Carbon Black Masterbatch 100 pans of styrene-butadiene rubber (®ESBR Buna EM 1502), 40 pans of carbon black N 110, 5 pans of an aromatic oil (®Naftolen NV) and the stabiliser indicated in Table 1 or 2 are mixed in a ®emer & Pfleiderer LH 1 laboratory mixer at 60° C. and 50 rpm. The carbon black masterbatch so obtained is rolled at 50° C. for 5 minutes on a roll mill.

II) Oven Ageing 10 mm specimens are moulded in a press at 80° C. from the rolled sheet obtained in I) above and subjected to oven ageing at 70° C. The Mooney viscosities, which are a measure of the oxidative crosslinking of the black-filled rubber, are determined at regular intervals in accordance with ASTM D 1646-72. To prevent the measuring range of the apparatus being exceeded after only short ageing times, a departure is made from the customary conditions by measuring the Mooney viscosities serving as working criterion at 150° C. after a warm-up time of 4 minutes. Minor changes in the Mooney viscosity show good stabilisation of the black-filled rubber. The results are set out in Table 1.

TABLE 1

| Stabiliser | Mooney viscosity (ML 4 + 4(150)) of black-filled SBR after weeks of oven ageing at 70° C. | | | | |
| --- | --- | --- | --- | --- | --- |
| | 0 | 4 | 5 | 6 | 7 |
| — | 42 | 60 | 68 | 82 | — |
| 0.3% (A) | 42 | 54 | 57 | 66 | 68 |

0.3% means 3 parts per 100 parts of styrene-butadiene rubber.
(A): isotridecyl-(3,5-di-tert-butyl-4-hydroxybenzylthio)acetate III) Brabender Ageing The rolled sheet obtained in I) is subjected to ageing at 180° C. and 60 rpm for 30 minutes. The degree of rise in torque (maximum torque) is a measure of the effectiveness of the stabilisation, for temperature, shearing forces and oxygen damage the rubber. The smaller the maximum torque the better the stabilisation. The test results are set out in Table 2.

TABLE 2

| Stabiliser | Maximum torque in Nm after 30 min Brabender ageing at 180° C. and 60 rpm |
| --- | --- |
| — | 28.7 |
| 0.3% (A) | 17.2 |

0.3% means 3 parts per 100 parts of styrene-butadiene rubber.
(A): isotridecyl-(3,5-di-tert-butyl-4-hydroxybenzylthio)acetate

What is claimed is:

1. A composition comprising
    a) a substantially uncrosslinked black-filled rubber homopolymer, copolymer or terpolymer based on diene monomers, and
    b) at least one compound of formula (I)

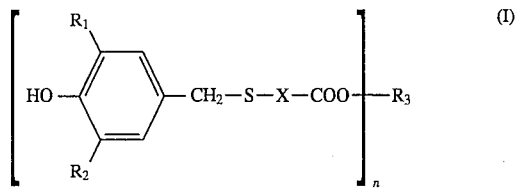

wherein n is 1, 2, 3 or 4, $R_1$ and $R_2$ are each independently of the other $C_1$–$C_4$alkyl or $C_5$–$C_8$cycloalkyl, X is methylene or ethylene and, when n is 1, $R_3$ is $C_1C_{20}$alkyl, $C_3$–$C_{20}$alkyl which is interrupted by —O— and/or —S—; $C_3C_{20}$alkenyl, $C_5C_{12}$cycloalkyl, $C_1$–$C_4$alkyl-substituted $C_5$–$C_{12}$cycloalkyl; phenyl, $C_1C_4$alkyl-substituted phenyl; $C_7$–$C_{10}$phenylalkyl or $C_7$–$C_{10}$phenylalkyl which is substituted in the phenyl moiety by $C_1$–$C_4$alkyl; when n is 2, $R_3$ is $C_2$–$C_{10}$alkylene, $C_4$–$C_{10}$ alkylene which is interrupted by —O— and/or —S—, $C_6$–$C_{12}$cycloalkylene or phenylene; when n is 3, $R_3$ is $C_3$–$C_8$alkanetriyl and,
when n is 4, $R_3$ is $C_4$–$C_8$alkanetetrayl, and with the proviso that the composition is substantially free of sulfur or peroxide.

2. A process for stabilizing a black-filled rubber homopolymer, copolymer or terpolymer based on diene monomers, the rubber being substantially free of sulfur or peroxide, against oxidative crosslinking, which comprises incorporating in said rubber at least one compound of formula I according to claim 1.

3. A composition according to claim 1, wherein n is 1, 2, 3 or 4, $R_1$ and $R_2$ are each independently of the other $C_1$–$C_4$alkyl or cyclohexyl and, when n is 1, $R_3$ is $C_5$–$C_{18}$alkyl, $C_3$–$C_{20}$alkyl which is interrupted by —O— or —S—; $C_3$–$C_{20}$alkenyl, $C_5$–$C_7$cycloalkyl, $C_1$–$C_4$alkyl-substituted $C_5$–$C_7$cycloalkyl; phenyl, $C_1$–$C_4$alkyl-substituted phenyl; benzyl or benzyl which is substituted in the phenyl nucleus by $C_1$–$C_4$alkyl and, when n is 2, R3 is $C_2$–$C_8$alkylene, $C_4$–$C_{10}$lkylene which is interrupted by —O— or —S—, cyclohexylene or phenylene.

4. A composition according to claim 1, wherein n is 1, 2, 3 or 4, $R_1$ and $R_2$ are each independently of the other methyl, tert-butyl or cyclohexyl and, when n is 1, $R_3$ is $C_5$–$C_{15}$alkyl, $C_3C_{10}$alkyl which is interrupted by —O—or —S—, $C_3C_{20}$alkenyl, cyclohexyl, methyl- or butyl-substituted cyclohexyl; phenyl, methyl- or butyl-substituted phenyl; or benzyl, and, when n is 2, $R_3$ is $C_2$–$C_6$alkylene or $C_4$–$C_6$alkylene which is interrupted by —O— or —S—.

5. A composition according to claim 1, wherein n is 1, 2 or 4, $R_1$ and $R_2$ are each independently of the other methyl or tert-butyl and, when n is 1, $R_3$ is $C_8$–$C_{13}$alkyl and, when n is 2, $R_3$ is $C_2$–$C_6$alkylene or $C_4$–$C_6$alkylene which is interrupted by —O— and, when n is 4, $R_3$ is pentaerythrityl.

6. A composition according to claim 1, wherein n is 1, $R_1$ and $R_2$ are tert-butyl, X is methylene and $R_3$ is $C_8$–$C_{13}$alkyl.

7. A composition according to claim 1, wherein the diene monomer is selected from the group consisting of butadiene, isoprene, chloroprene, dicyclopentadiene, 1,4-hexadiene and ethylidene norbornene.

8. A composition according to claim 1, wherein the diene content of the rubber is preferably 0.3-100% by weight, based on the rubber without carbon black.

9. A composition according to claim 1, wherein component a) is black-filled butadiene, black-filled isoprene or a black-filled styrene-butadiene copolymer.

10. A composition according to claim 1, wherein component a) is a diene monomer-based black-filled copolymer containing 50 to 90% by weight of diene, based on the rubber without carbon black, the diene monomers are budatiene, isoprene or chloroprene, and the comonomers are styrene, acrylonitrile or isobutylene.

11. A composition according to claim 1, wherein the weight ratio of carbon black/rubber in component a) is 0.2/1 to 1/1.

12. A composition according to claim 1, which contains component b) in a concentration of 0.05 to 5% by weight, based on the rubber without carbon black.

13. A composition according to claim 1, comprising as additional component c) 0.01 to 90% by weight, based on the rubber without carbon black, of a naphthenic, aromatic or paraffinic oil or a mixture thereof.

* * * * *